United States Patent Office 3,499,264
Patented Mar. 10, 1970

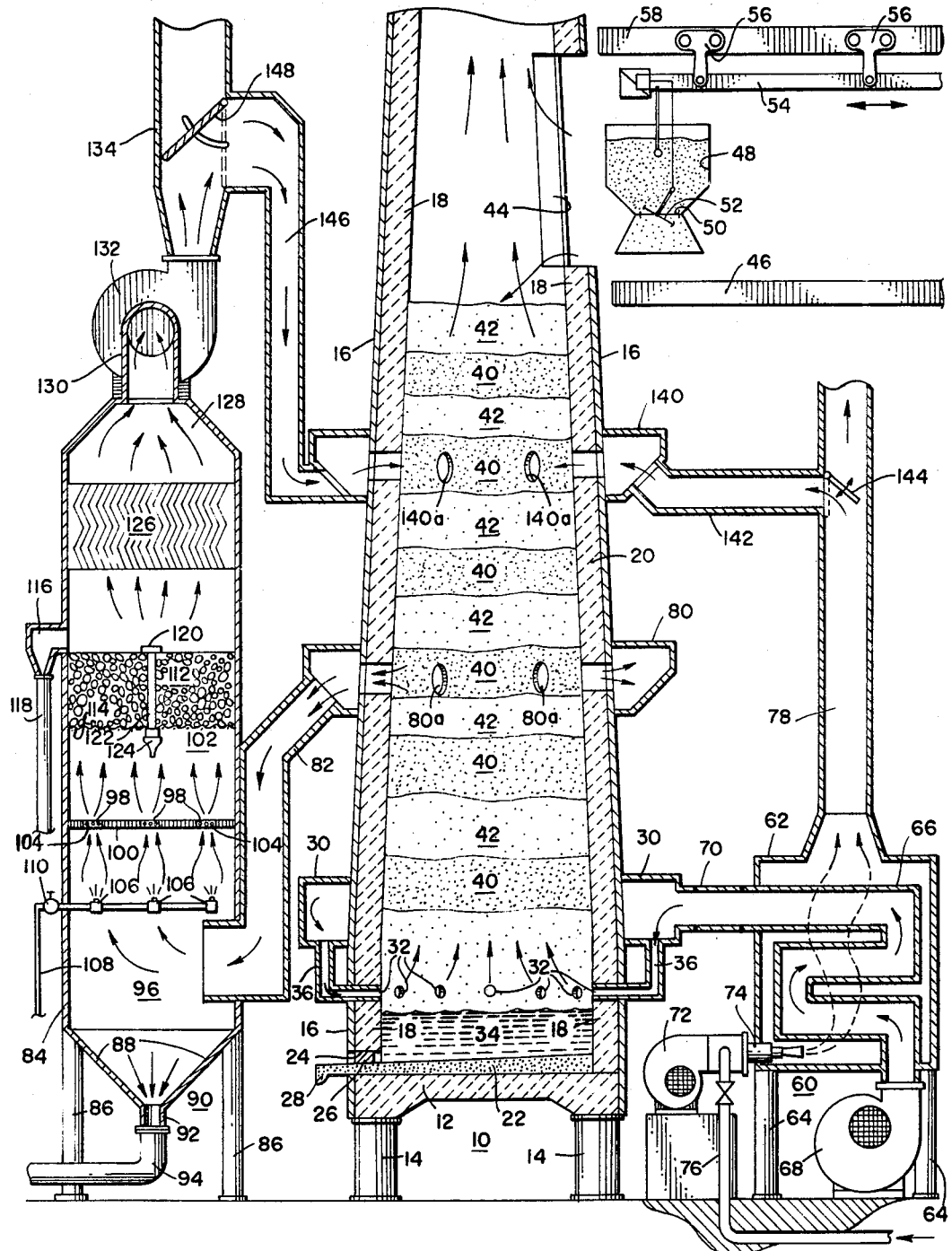

3,499,264
METHOD AND APPARATUS FOR CONTROLLING FUME AND DUST EMISSIONS FROM CUPOLA FURNACES AND THE LIKE
Frank O. Ekman, Barrington, Ill., assignor to National Dust Collector Corporation, Skokie, Ill., a corporation of Illinois
Filed June 12, 1968, Ser. No. 736,422
Int. Cl. B01d 53/34
U.S. Cl. 55—90                                       6 Claims

ABSTRACT OF THE DISCLOSURE

A method and apparatus for controlling dust and fume emissions from a cupola furnace of the type including a stack having a charging opening therein spaced upwardly of a blast gas tuyere system adjacent the lower end of the stack. The method includes the steps of removing a portion of the gases flowing in the stack at a takeoff level intermediate the tuyere system and the charging opening. The portion of the gases removed are passed through a dust collector for treatment to remove dust, fume, and contaminants therefrom. Inert, noncombustible gas is introduced into the stack forming a blanket between the charging opening and the takeoff level so that outside air infiltrating into the stack through the charging opening is greatly reduced, thereby preventing the possibility of explosion in said stack by rapid oxidation of the gases generated in the cupola.

---

The present invention relates to a new and improved method and apparatus for controlling dust, fume, and contaminant emissions discharged from the stack of cupola furnaces and the like.

One commonly employed method of controlling air contaminating dust and fume emissions from cupola furnaces is to divert the stack gases into a dust collector for treatment. The gases are taken from the top of the stack or at an offtake located above the charging opening therein. In such an arrangement the dust collector must be large enough in capacity to handle all of the gases generated in the furnace plus a large amount of outside air which infiltrates into the stack through the charging opening, and accordingly operating costs are increased.

Another system employed is an arrangement wherein only a portion of the stack gases are removed from the stack, and these are removed at a level below the charging opening. In this type of system, the volume of gases treated in the dust collector is reduced significantly as compared to the previous method, because only a small volume of air infiltrating through the charging opening is included with the gases generated in the furnace which are treated in the dust collector. Theoretically, in the latter type of system, if the gas volume taken from the stack for treatment in the dust collector is slightly in excess of the volume of blast gas input to the furnace, a slight downdraft will be created through the burden in the stack and this prevents the escape of any significant volume of untreated gas out through the upper end of the stack. While the system of diverting the gas in the stack at a level some distance below the charging opening is economical from the standpoint of a reduced quantity or volume of gas processed and lower exit temperatures in the stack, if the control equipment should malfunction an explosion hazard can be created because the gases generated in the furnace are normally rich in carbon monoxide, and if excessive outside air flows into the stack through the charging opening, rapid oxidation of explosive proportions can take place. Such explosions are not infrequent in this type of installation.

The present invention is an improvement over the methods described and affords greater advantages and economy of operation than either, but without the attendant danger of explosion.

It is therefore an object of the present invention to provide a new and improved method of controlling air polluting fume and dust emissions from cupola furnaces and the like.

It is another object of the present invention to provide a new and improved apparatus for controlling air polluting fume and dust emissions from cupola furnaces and the like.

Yet another object of the present invention is a new and improved method of the character described wherein it is necessary to process only a minimum volume of gases from the furnace in a dust collector and yet maintain the remaining gases flowing out the stack relatively free of fume and dust contaminant.

Another object of the present invention is the provision of a new and improved method for controlling fume and dust emissions from cupola furnaces wherein a volume of noncombustible or inert gas is introduced into the cupola stack between the charging opening and the offtake to the dust collector so that explosive conditions created by an excessive infiltration of outside air into the stack through the charging opening are eliminated and minimized.

Another object of the present invention is the provision of a new and improved method of controlling dust and fume emission from a cupola furnace wherein a blanket of noncombustible or inert gas in a cooled and wetted condition is introduced into the cupola stack between the charging opening therein and the offtake to the dust collector.

Still another object of the present invention is the new and improved method of the character described wherein a blanket of noncombustible or inert gas introduced into the cupola stack between the charging opening and the offtake to the dust collector is supplied from the exhaust outlet of the dust collector and/or from the exhaust products generated in the air blast heater of the cupola furnace.

Yet another object of the present invention is the provision of a new and improved method of controlling dust and fume emissions from a cupola furnace stack wherein the blanket of noncombustible or inert gas introduced into the stack beneath the charging opening and above the offtake to the dust collector comprises a mixture of exhaust gases generated in the air blast heater and the exhaust gases from the dust collector, which have been cleansed and are in cooled and wetted condition.

The foregoing and other objects and advantages of the present invention are accomplished in one embodiment thereof comprising a new and improved method and apparatus for controlling dust and fume emissions from cupola furnaces and the like. The furnace stack includes a charging opening spaced upwardly from the lower end and a blast gas tuyere system is provided adjacent the lower end of the stack for blowing the charge or burden in the furnace stack. A portion of the gases generated in the process carried on in the furnace flow upwardly through the charge or burden in the stack and are drawn off at a level spaced between the tuyere system at the lower end and the charging opening. This portion of gas is passed through a dust collector wherein the dust, fume, and other contaminants therein are removed and collected. In accordance with the invention, a blanket of inert or noncombustible gas is introduced into the cupola stack at a level spaced between the charging opening and the offtake level to the dust collector, and this inert gas prevents excessive outside air from infiltrating into the stack through the charging opening and then passing downwardly toward the lower end of the stack so that the chances of the creation of an explosive condition within the stack is greatly reduced or eliminated. The inert or noncombustible gas may be supplied from the cooled, wetted gases discharged from the dust collector or from the heated products of combustion generated in the blast gas heater of the furnace.

The apparatus of the present invention includes a bustle offtake means on the stack at a level intermediate the tuyere means at the lower end and the charging opening spaced upwardly thereof. A portion of the gas flowing in the stack is removed through the offtake means and is directed into the dust collector for cleaning. Preferably, the dust collector is of the wet scrubber type wherein liquid is added to cool the gas and collect the contaminants thereof. An intake bustle is provided on the stack at a level between the bustle offtake means and the charging opening for introducing noncombustible or inert gas into the stack forming a blanket or layer between the charging opening and the bustle offtake means. The blanketing effect of the gas introduced through the intake bustle minimizes or eliminates the chances of explosion in the stack because of excessive outside air infiltrating into the stack through the charging opening and mixing with the combustible gases generated in the lower portion of the furnace. Inert gases are supplied to the intake bustle through suitable duct systems, and can be taken from the exhaust from the dust collector or from the exhaust of the blast gas heater of the cupola or from both sources.

For a better understanding of the present invention reference should be had to the following detailed description taken in conjunction with the claims and the drawings, in which:

The drawing is a sectional elevational view of a cupola furnace and associated components in accordance with the features of the present invention.

Referring now, more particularly, to the drawing, therein is illustrated a typical cupola furnace 10, including a circular base 12 supported from the floor or other surface on a plurality of support legs 14. The furnace includes an outer steel shell 16 which is lined with an acid or basic refractory lining material 18, and the shell includes a cylindrical lower portion and an upper portion tapered to slope inwardly and progressively smaller in diameter toward the top or upper end. The refractory lining material 18 is formed to fit the tapering contour of the shell, and together the shell and lining form an elongated vertically extending tapering cupola stack 20. The base structure 12 supports a sand bottom 22 for the furnace which is sloped downwardly towards one side to a radial tap hole 24 for removing molten metal 34 from the cupola. A removable plug 26 is inserted to close the tap opening when molten metal 34 is not being withdrawn, and the sloping sand bottom 22 extends outwardly beyond the cylindrical shell 16 and is provided with a pouring lip 28 at the outer end to guide the molten metal into a hopper or bucket when the furnace is tapped.

Spaced upwardly above the said bottom 22 is provided an annular wind chamber 30 for supplying heated blast air to the furnace for blowing the charge or burden therein. A plurality of radially spaced tuyere openings 32 are formed in the furnace wall above the base and these tuyere openings 32 are connected to the wind chamber by a plurality of elbowlike windpipes 36.

In order to charge the cupola stack with alternate layers of pig iron and/or scrap iron 40 on one hand, and coke and limestone 42 on the other, the stack 20 is provided with an enlarged charging opening 44 spaced some distance above the lower end of the furnace. The bottom of the opening is approximately level with a charging floor structure 46 and charging of the cupola is accomplished by the use of a movable charging bucket 48 having a discharge opening 50 in the bottom controlled by a movable gate valve 52. The charging hopper is supported from a traveling rail 54 carried on a pair of roller brackets 56 which are in turn supported on a suitable track member 58 mounted above the charging floor. As the heating and refining process in the cupola furnace is carried on, additional layers of pig and/or scrap iron and limestone and coke are introduced through the charging opening 44 by means of the charging bucket 48, and a pool of molten metal 34 collects at the bottom of the cupola.

In order to supply heated and pressurized air to the wind chamber 30 for blowing the charge in the cupola through the tuyere openings 32, the system includes an air blast heater generally indicated at 60, which is capable of supplying a large volume of blast air at elevated temperatures in the range of 400 to 1500° F. and at pressures in the range of 1 to 3 p.s.i. The air blast heater includes a housing 62 supported on a plurality of legs 64 and a suitable, tubular, heat exchanger 66 is mounted in the housing. The lower end of the heat exchanger 66 extends downwardly through the bottom wall of the housing 62 for connection with a blower compressor which is capable of delivering the required volume of airflow at the desired pressure. The upper or outlet end of the heat exchanger 66 extends outwardly through a sidewall of the housing and is connected to the wind chamber 30 by a supply duct 70. As the blast air passes through the heat exchanger 66, it is heated by hot gases flowing around the outside of the heat exchanger, and these heated gases are produced in a burner assembly including a blower 72 and a nozzle 74 which has an outlet extending into the lower end of heater housing 62. Natural gas, oil, or other fuel is supplied to the burner assembly through a supply line 76, and suitable thermostatic controls and regulator valves are provided for regulating and controlling the temperature of the blast air as it leaves the heat exchanger 66 into the supply duct 70. The hot products of combustion generated by the burner assembly pass through the heater housing 62 and around the heat exchanger 66 thereby heating the blast air flowing internally through the heat exchanger and the products of combustion leave the heater housing through a suitable exhaust or outlet stack 78. The heated gas passing upwardly through the exhaust stack 78 of the air blast heater contains a large proportion of carbon dioxide, water, small amounts of carbon monoxide, and other constituents and the gas can be generally classified as inert because complete combustion is obtained by the use of modern burners available.

In accordance with the present invention, the cupola furnace 10 is provided with an annular, bustle offtake chamber 80 mounted on the stack 20 and spaced upwardly of the lower end between the wind chamber 30 and the charging opening 44. The bustle offtake is in communication with the interior of the stack 20 through a plurality of radially spaced openings 80a and is connected to a separate dust collector 90 closely adjacent to the cupola furnace through a downtake duct 82 having its lower end in communication with an inlet chamber 96 in the lower end of an upright housing 84 of the dust collector. The dust collector 90 may be of a known construction, such as shown in U.S. Patent No. 2,645,304 and, preferably, is of the wet scrubber, high efficiency type, such as that shown in U.S. Patent No. 3,348,825, which patents are assigned to the same assignee as the present invention.

Briefly, the dust collector 90 includes a rectangular or cylindrical upstanding housing 84 supported by a plurality of legs 86 at the base. The bottom of the housing is closed by a plurality of inwardly and downwardly sloping sidewalls 88 forming a liquid sump for collecting contaminated scrubbing liquid used in the dust collecting process. The lower end of the sump is connected by a suitable fitting 92 to a drainpipe 94 for carrying away the contaminated scrubbing liquid to a treatment station or for discharge to a sewer or settling pond. Immediately above the sump in the housing 84 is the inlet chamber 96 in communication with the lower end of downtake duct 82 from which the contaminated gases from the bustle offtake 80 are supplied. The incoming gases flow upwardly in the housing 84 and pass through one or more openings 98 of relatively small cross-sectional area which are formed in a horizontal dividing wall 100 separating the inlet chamber 96 from a filter bed containing chamber 102. As the gases flow through the openings 98 or nozzles, the gas velocity is substantially increased, as indicated by the converging and diverging arrows, and each of the openings 98 is provided with a plurality of spherical filter elements 104 therein, which further reduce the effective flow cross section and further increase the velocity of the gas to provide more efficient scrubbing, as more fully described in U.S. Patent No. 3,348,825. The incoming gases flowing upwardly toward the nozzle openings 98 and filter elements 104 are prewetted by means of a plurality of spray nozzles 106 which introduce finely divided droplets or sprays of contaminant collecting scrubbing liquid into the gas flow to wet and collect the fume, dust, and other contaminants in the gas. Scrubbing liquid for the nozzles 106 is supplied by a piping manifold 108, and the amount of liquid supplied is controlled by a suitable valve 110. The wetted gases flowing upwardly through the nozzles or openings 98 in the wall 100 pass upwardly in the filter chamber 102 which contains a large filter bed 112 containing a plurality of spherical filter elements which are supported on a screen or mesh 114. An intense foaming action takes place within the filter bed 112 and dust, fume, and other contaminant particles in the gases are wetted and collected in the scrubbing liquid. Scrubbing liquid and foam reaching the upper level of the filter bed is removed from the housing 84 by a weir system 116 which is connected to a suitable drain or water treatment system by a drain line 118, and thus the height of the foam bed formed above the filter bed 112 is limited by draining off excess liquid and foam. Also, a suitable liquid drain weir 120 may be provided to remove excess liquid from the center of the filter bed and discharge the liquid downwardly through a pipe 122 and rubber, sock-type valve 124 into the lower portion of the filter chamber 102 beneath the filter bed 112. By the time the gases pass through the upper level of the filter bed, almost all of the fume, dust, and other contaminant particles in the gas have been removed therefrom and are collected in the scrubbing liquid which is drained off. The cleansed gases continue flowing upwardly and pass through a demisting vane assembly 126, comprising a plurality of closely spaced zigzag vanes. The zigzag vanes cause abrupt reversal of flow direction of the gas and drops of liquid remaining in the gas collect on the vanes and eventually gravitate back into the filter bed. The demisting vane assembly 126 provides the final step in cleansing the gas which then flows upwardly into an outlet chamber 128 at the upper end of the housing 84. The cleansed gases pass from the housing into a duct 130 connected to an exhaust blower 132 which discharges the gas upwardly through an outlet or exhaust stack 134. While the cleansed gas passing through the stack 134 may contain considerable amounts of carbon monoxide, for most purposes the gas can be considered as inert because of the relatively high moisture content and relatively low temperature thereof.

In accordance with the present invention, the cupola furnace 10 is provided with an annular, bustle intake chamber 140 mounted on the stack between the offtake bustle 80 and the charging opening 44. Inert or noncombustible gas is supplied to the cupola stack 20 from the intake bustle 140 through a plurality of radially spaced openings 140a and this gas serves to blanket or block any appreciable amount of outside air from infiltrating into the stack through the charging opening 44 and flowing downwardly to mix with the combustible gases generated at the lower end of the stack and flowing upwardly toward the charging opening The inert or noncombustible gas introduced into the stack through the intake bustle 140 helps to divert the gases flowing upwardly in the stack from the lower end of the furnace into the bustle offtake 80 connected to the dust collector 90. Some of the gas introduced into the stack through the air blast from the tuyere 32 and the gaseous products generated by the refining process in the lower portion of the cupola may flow upwardly through the blanket of inert gas and past the intake bustle 140 for eventual discharge out the top of the cupola stack 20. However, most of the contaminants and harmful dust and fume emissions in the gas have been taken off through the offtake bustle 80 and have been treated in the dust collector 90 before discharge from the exhaust stack 134 so that only a relatively small volume of pollutants are discharged from the system into the atmosphere.

In accordance with the present invention, two sources of noncombustible or inert gas are available to the intake bustle 140 for introduction into the stack through the openings 140a. One source of gas is provided by the heated products of combustion from the air blast heater 60, and a supply duct 142 is provided to interconnect the exhaust stack 78 of the air blast heater with the intake bustle 140. A suitable control damper 144 is provided in the stack 78 to regulate the amount of hot gas diverted from the stack for flow into the intake bustle 140. Because the gaseous products from the stack 78 are for the most part completely oxidized and contain relatively low percentages of carbon monoxide and oxygen, these gases, when diverted into the cupola stack through the intake bustle, are very effective in forming a blanket of inert gases in the stack for preventing explosive conditions from occurring therein. Such explosive conditions could be present if excessive outside air enters into the stack through the charging opening 44 and flows downwardly in the stack to mix with the unoxidized gases produced in the cupola process. The relatively inert, heated products of combustion from the air blast heater exhaust stack 78 flow from the intake bustle openings 140a in a slight downdraft in the stack and for the most part are taken off in the offtake bustle 80 along with the major portion of gases generated in the refining process taking place in the cupola This mixture is treated in the dust collector 90 and, accordingly, pollutant emission problems from the discharge of gases from the system are reduced. The damper 144 is adjusted as desired to regulate the amount of gas diverted from the stack 78 into the cupola stack 20 for providing the necessary blanket or barrier therein to prevent excessive outside air from infiltrating through the charging opening 44 and flowing downwardly in the stack.

In accordance with the present invention, an alternate source of inert or noncombustible gas available for introduction through the intake bustle 140 is provided by using the treated exhaust gases from the outlet stack 134 of the dust collector 90. These gases are extremely well suited for use in the blanketing process because during their treatment in the dust collector the gas temperature is reduced significantly and the moisture content is increased signifiacntly by the liquid introduced in the cleaning process. The treated gas in the exhaust stack 134 of the dust collector 90 is almost free of contaminating impurities, and if not used as a source of inert gas instead of the exhaust gas from the air blast heater, can be discharged into the atmosphere with relatively little or no pollution problems. Moreover, because the exhaust gas from the dust collector contains cooled carbon monoxide any excess gas introduced into the stack through the intake bustle 140 will tend to migrate up through the burden or charge in the stack and burn in a controlled manner without danger of explosion.

A duct 146 is interconnected between the bustle intake 140 and the exhaust stack 134 of the dust collector, and a suitable control damper 148 is provided to regulate the amount of gases diverted from the stack into the intake bustle 140. If desired, gas from the dust collector stack 134 and from the air blast heater exhaust stack 78 can be supplied to the intake bustle 140, and the desired proportions can be regulated by adjusting the dampers 144 and 148.

In theory, a small volume of inert gas introduced through the intake bustle 140, as compared to the volume of air blast input through the tuyeres 32 may cause a slight downdraft in the stack between the bustle intake 140 and the bustle offtake 80 so that the inert gas forms an effective buffer zone in the stack 20, resulting in the fact that almost none of the gas in the stack containing large amounts of impurities can escape upwardly and be discharged at the upper end of the cupola stack without having been treated to remove the objectionable contaminants therefrom in the dust collector 90.

The present invention provides a very economical process for the effective utilization of readily available sources of inert gas from either the air blast heater or the dust collector, or both, to reduce the hazard of explosion Moreover, the present invention reduces and eliminates the discharge of gas containing a large amount of pollutants, such as dust and fume. When the exhaust gas from the air blast heater is used as a source of inert gas, the possibility of atmospheric contamination from this source is reduced.

The method of the present invention greatly reduces or eliminates the chance of an explosion in the stack 20 caused by excessive outside air entering the cupola stack through the charging opening 44 and moving downwardly in the stack and, in addition, provides the advantage of minimizing the volume of gas that must be treated in the dust collector without affecting the efficiency of the system.

While the foregoing description has been specifically directed for application to a cupola furnace, it is to be understood that the invention is useful in many other applications wherein exhaust gases having atmospheric pollutants therein are generated in an exhaust stack. In any installation or process wherein polluting gases are flowing in a discharge stack or conduit having an opening therein whereby outside air might infiltrate through the opening and mix with the gases creating an explosion hazard, the invention is useful. In such installations or processes, suitable sources of relatively inert or noncombustible gases, other than an air blast heater, are generally available for forming the inert blanket or quenching zone within the stack or conduit, and the exhaust gas from the associated dust collector or wet scrubber is usually a conveniently available source.

Also, it is to be understood that the terms "inert" or "noncombustible," as applied in the specification and claims to the gases introduced to form the blanket or buffer zone between the opening and the lower end of the stack or conduit containing the combustible gases flowing from or generated in the process, are not meant to require that the gases be inert or noncombustible in a strict chemical sense. In other words, these gases may contain amounts of chemically active and/or oxidizing gases, such as air, oxygen, carbon monoxide, etc.; however, the amounts present and the conditions present in the stack, such as temperature, moisture content, etc., are such that for practical purposes the introduction of the gas will prevent the formation of explosive condtions and rapid oxidation within the stack that would otherwise occur if the amount of outside air entering through the opening in the stack were uncontrolled.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A method of controlling dust and fume emissions from a cupola furnace stack and reducing the hazard of explosion in said stack, said stack having a charging opening spaced upwardly of a blast gas tuyere system adjacent the lower end of the stack, said method comprising the steps of removing the gases flowing upwardly in said stack at a takeoff level intermediate the tuyere system and charging opening, passing said removed gases through a dust collector for extracting dust, fume and contaminants therefrom, introducing inert gas comprising high temperature exhaust gases from the exhaust of a cupola blast gas heater into said stack at a level between said charging opening and said takeoff level and forming an inert gas blanket in said stack for retarding the downward flow of outside air from said charging opening toward said lower end of said stack.

2. The method of claim 1 wherein said inert gas additionally includes a portion of cooled and wetted, cleansed exhaust gas from the exhaust of said dust collector.

3. The method of claim 1 wherein said inert gases introduced into said stack are relatively lower in temperature than the gases generated in the lower end portion of said stack.

4. The method of claim 1 wherein said inert gases introduced into said stack are relatively higher in moisture content than the gases generated in the lower end portion of said stack.

5. Apparatus for controlling dust and fume emissions from a cupola furnace of the type having a stack and for reducing the hazard of explosion in said stack, said furnace including tuyere means adjacent the lower end of said stack and a charging opening spaced upwardly thereof, said apparatus comprising offtake means on said stack intermediate said tuyere means and said charging opening for diverting upwardly flowing gases generated in said stack exteriorly thereof, a blast gas heater for supplying high temperature blast gas to said tuyere means, said blast gas heater including an exhaust opening for discharge of heated products of combustion used for heating said blast gas, dust collector means in communication with said offtake means for removing contaminants from said diverted portion of gas, and gas intake means on said stack intermediate said offtake means and said charging opening for introducing inert gas supplied from the exhaust opening of said blast gas heater into the gas flow in stack to form a blanket for retarding the downflow of outside air from said charging opening toward the lower end portion of said stack.

6. The apparatus of claim 5 wherein said dust collector is of the wet scrubber type including an outlet for cleansed gases and duct means interconnecting said dust collector outlet and said inert gas intake means on said stack for introducing cooled, wetted, cleansed gases from said dust collector into said cupola stack.

References Cited

UNITED STATES PATENTS

| | | | |
|---|---|---|---|
| 2,078,747 | 4/1937 | Vial | 75—43 |
| 2,729,301 | 1/1956 | Ekstrom | 55—257 |
| 2,746,858 | 5/1956 | Schneible et al. | 55—257 |
| 2,940,733 | 6/1960 | Umbricht | 55—257 |
| 3,348,825 | 10/1967 | McIlvaine | 55—257 |

REUBEN FRIEDMAN, Primary Examiner

C. N. HART, Assistant Examiner

U.S. Cl. X.R.

55—257; 75—43